Patented Mar. 11, 1952

2,588,975

UNITED STATES PATENT OFFICE 2,588,975

REACTION RATE OF AN EMULSION POLYMERIZATION PROCESS

Charles F. Fryling, Phillips, and Archie E. Follett, Borger, Tex., assignors to Phillips Petroleum Company, a corporation of Delaware No Drawing. Application January 16, 1950, Serial No. 138,938

12 Claims. (Cl. 260—84.1)

This invention relates to the polymerization of unsaturated organic compounds while dispersed in an aqueous medium. In one particular embodiment the invention relates to a pretreatment of certain constituents to be charged to an emulsion polymerization process.

It is well known in the art to produce polymers of high molecular weight, such as synthetic rubber, by copolymerizing a conjugated diolefin such as 1,3-butadiene, or other conjugated diene, with a vinyl aromatic compound, such as styrene. When it is desired to effect such polymerization at low temperatures, highly activated recipes are employed in order that the reaction will proceed at a satisfactory rate. Recipes of the redox type, that is, formulations wherein both oxidizing and reducing components are present, have been widely used. Oxidizing components which have been found particularly effective are organic hydroperoxides containing at least ten carbon atoms. A modifying agent, such as an alkyl mercaptan, is also generally present. While recipes of this type are usually very satisfactory, one of the problems involved, particularly when operating at low temperatures and low activator levels, has been to obtain reproducible results.

We have now discovered a process for effecting low temperature redox emulsion polymerization reactions whereby marked improvements in reproducibility are accomplished and increased conversion rates are realized. The method comprises a step wherein a mixture of the mercaptan, the organic hydroperoxide, and the vinyl monomer is aged under controlled conditions prior to carrying out the polymerization reaction.

An object of this invention is to polymerize unsaturated organic compounds.

Another object of this invention is to improve emulsion polymerization of unsaturated organic compounds.

A further object of this invention is to effect more reproducible polymerizations.

Still another object of this invention is to polymerize a monomeric material at a faster rate.

Other objects and advantages of this invention will become apparent, to one skilled in the art, from the accompanying disclosure and discussion.

In polymerization processes heretofore employed, in which an organic hydroperoxide, a reductant, and an alkyl mercaptan are used, it has been the practice to charge the mercaptan and the organic hydroperoxide separately to the reactor. One method of operation frequently used is to charge an aqueous solution of the emulsifier, and then the antifreeze, such as methanol, if used. Styrene, or other vinyl aromatic compound, containing the mercaptan is then introduced followed by the hydroperoxide and then the butadiene. The temperature is then adjusted to the desired level, say $-10°$ C., and the activator solution added. The mixture is then agitated to get a good dispersion. It is sometimes preferred to alter the procedure by charging the activator solution after the emulsifier, and add the hydroperoxide last. In any event, the mercaptan and hydroperoxide are charged separately to the reactor. It is generally believed that contacting of these materials prior to charging them to the reactor will destroy their effectiveness. It was therefore surprising to discover that more reproducible results could be obtained, and increased conversion rates realized, if a mixture containing the mercaptan and the hydroperoxide, together with the vinyl aromatic compound, is aged under controlled conditions prior to carrying out the polymerization.

When operating according to a preferred embodiment of this invention, a mixture of the hydroperoxide, mercaptan, and vinyl aromatic compound, such as styrene, is first prepared and aged at a temperature usually in the range from $-20$ to $30°$ C., and preferably around $0°$ C., that is, in the range from $-10$ to $10°$ C., for a substantial period, more generally from one to 20 hours, or longer. The time of aging is dependent upon the temperature, a longer time being required at the lower temperature. In a preferred embodiment of the process, a mixture of the hydroperoxide, mercaptan, and styrene, together with an aqueous solution of the emulsifier, is aged at the desired temperature prior to carrying out the polymerization. In cases where an antifreeze agent such as methanol is employed, it is generally included as a part of the emulsifier solution. Numerous other variations may be introduced when carrying out this aging step. If the aging is carried out in the presence of an aqueous emulsifier solution satisfactory results are usually obtained if the materials are present in a quiescent zone, but inferior results are obtained if the two immiscible liquids are intimately mixed, as by agitation, throughout the aging period.

The hydroperoxides employed when carrying out polymerization reactions according to the method herein described are trisubstituted hydroperoxymethanes having usually not more than thirty carbon atoms per molecule. They can be represented by the formula R₃COOH wherein each R, individually, is one of the group consisting of aliphatic, cycloaliphatic, aromatic, olefinic, and cycloolefinic radicals. Each of these radicals can be completely hydrocarbon in character, and can be of mixed character, such as aralkyl, alkaryl, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether compounds, sulfur in similar compounds (i. e. mercapto compounds and thioethers), and halogen compounds. Such hydroperoxides can be easily prepared by simple oxidation, with free oxygen, of the corresponding hydrocarbon or hydrocarbon derivative, i. e. of the parent trisubstituted methane. The compound to be oxidized is placed in a reactor, alone or together with an inert diluent, heated to the desired temperature, and oxygen introduced at a controlled rate throughout the reaction period. The mixture is agitated during the reaction which is generally allowed to continue from about one to ten hours. The temperature employed is preferably maintained between 50 and 160° C., although in some instances it might be desirable to operate outside this range, that is, at either higher or lower temperatures. At the conclusion of the reaction the oxidized mixture may be employed as such, that is, as a solution of the hydroperoxide composition in the parent compound and/or inert diluent, or unreacted material may be removed and the residual hydroperoxide material employed. The major active ingredient in such a composition is the monohydroperoxide, or a mixture of monohydroperoxides. This hydroperoxide group appears to result from introduction of two oxygen atoms between the carbon atom of the trisubstituted methane and the single hydrogen atom attached thereto. Where there is another similar grouping in the molecule, the usual method of production just outlined appears to produce only the monohydroperoxide even though a dihydroperoxide appears to be structurally possible. Thus, in a simple case, from such an oxidation of triisopropyl benzene the primary product appears to be dimethyl(diisopropylphenyl)hydroperoxymethane, and from such an oxidation of diisopropylchlorobenzene is dimethyl(isopropylchlorophenyl) hydroperoxymethane.

One of the subgroups of these compounds is the alkaryl-dialkyl hydroperoxymethanes, in which the two alkyl groups are relatively short, i. e. have from one to three or four carbon atoms each, including dimethyl(tertiary-butylphenyl)-hydroperoxymethane, dimethyl(diisopropylphenyl)hydroperoxymethane, dimethyl(isopropylphenyl)hydroperoxymethane, dimethyl(dodecylphenyl)hydroperoxymethane, dimethyl(methylphenyl)hydroperoxymethane, corresponding methylethyl and diethyl compounds, and compounds with nonhydrocarbon substituents, such as dimethyl(isopropyldichlorophenyl) hydroperoxymethane, methylethyl(ethoxyphenyl)hydroperoxymethane, and the like. Another subgroup includes at least one long alkyl group directly attached to the hydroperoxymethane, such as methyldecyl(methylphenyl) hydroperoxymethane, ethyldecylphenylhydroperoxymethane, and the like. Still another subgroup includes trialkyl compounds, such as tertiary-butyl hydroperoxide, dimethyldecylhydroperoxymethane, and the like; aralkyl compounds, such as 1-phenyl-3-methyl-3-hydroperoxybutane, can also be considered to be members of this group. Another subgroup includes phenylcyclohexyl hydroperoxide(1-phenyl-1-hydroperoxycyclohexane), other similarly substituted hydroperoxycyclohexanes and hydroperoxycyclopentanes, and tetralin hydroperoxide, octahydrophenanthrene hydroperoxide, and the like. A further subgroup includes alkyldiaryl compounds, such as methyldiphenylhydroperoxymethane, methylphenyltolylhydroperoxymethane, and the like. A further subgroup is the triaryl compounds, such as triphenylhydroperoxymethane, tritolylhydroperoxymethane, and the like. These materials preferably will have a total of not more than thirty carbon atoms per molecule.

When a ferrous pyrophosphate activator is used, it is preferably prepared by admixing a ferrous salt, such as ferrous sulfate, with a pyrophosphate of an alkali metal, such as sodium or potassium, and water and heating this mixture, preferably for the length of time required for maximum activity. A reaction occurs between the salts, as evidenced by the formation of a grayish-green precipitate. When preparing the activator the mixture is generally heated above 50° C., for variable periods depending upon the temperature. For example, if the mixture is boiled, a period of twenty minutes or less is sufficient to produce the desired activity, and the time of boiling may even be as low as 30 seconds. One convenient method of operation involves maintaining the temperature of the activator solution at about 60° C. for a period of heating ranging from 10 to 30 minutes. Prior to heating the activator mixture the vessel is usually flushed with an inert gas such as nitrogen. In general it is preferred to heat the mixture below the boiling point, say at a temperature around 55 to 75° C.

In cases where the activator is prepared just prior to use, it is generally employed in the form of an aqueous dispersion as described above. However, the solid activator may be isolated and the crystalline product used, and in this form it is preferred in some instances. Subsequent to heating the activator mixture, it is cooled to around room temperature and the solid material separated by centrifugation, filtration, or other suitable means, after which it is dried. Drying may be accomplished in vacuo in the presence of a suitable drying agent, such as calcium chloride, and in an inert atmosphere such as nitrogen. When using this crystalline product in emulsion polymerization reactions, it is generally charged to the reactor just prior to introduction of the butadiene. This crystalline material is believed to be a sodium ferrous pyrophosphate complex, such as might be exemplified by the formula $2Na_2FeP_2O_7.Na_4P_2O_7$, or perhaps $Na_2FeP_2O_7$. In any event the complex whatever its composition, is only slightly soluble in water and is one active form of ferrous ion and pyrophosphate which can be successfully used in our invention. It may be incorporated in the polymerization mixture as such, or dissolved in sufficient water to produce solution. Other forms of multivalent metal and pyrophosphate may also be used, so long as there is present in the reacting mixture a soluble form of a multivalent metal, capable of existing in two valence states and present primarily in the lower of two valence states, and a pyrophosphate.

The amounts of activator ingredients are usually expressed in terms of the monomers charged. The multivalent metal should be within the range of 0.10 to 3 millimols per 100 parts by weight of monomers, with 0.2 to 2.5 millimols being generally preferred. The amount of pyrophosphate should be within the range of 0.10 to 5.6 millimols based on 100 parts by weight of monomers; however, the narrower range of 0.2 to 2.5 millimols is more frequently preferred. The mol ratio of ferrous salt to alkali metal pyrophosphate can be between 1:0.2 and 1:3.5, with a preferred ratio between 1:0.35 and 1:2.8.

As previously stated, it is usually desirable that the multivalent metal be present in its lower valence state. With some recipes, it is unnecessary to include an organic reducing agent either in the activator solution or in the polymerization mixture. However, particularly at temperatures above 0° C., a faster reaction is sometimes obtained with some recipes when a small amount of an organic reducing agent, such as a reducing sugar, is included in the polymerization recipe, and it is frequently more desirable to incorporate this in the reaction system by first including it in the activator solution along with the other ingredients. When the multivalent ion is present in its higher valence state, it is usually necessary to include in the activator solution an organic reducing agent. As a result the multivalent ion will be partially reduced and a substantial amount of the multivalent ion will be present in its lower valence state when the activator solution is ready for addition to the polymerization mixture.

Emulsifying agents which are applicable in these low temperature polymerizations are materials such as potassium laurate, potassium oleate, and the like, and salts of rosin acids. Particularly useful are the specific mixtures of salts of fatty acids and of rosin acids, which seem to have a synergistic action when used with some of these same hydroperoxides, as more fully disclosed and claimed by Charles F. Fryling and Archie E. Follett in their application Serial No. 72,534, filed January 24, 1949. However, other emulsifying agents, such as nonionic emulsifying agents, salts of alkyl aromatic sulfonic acids, salts of alkyl sulfates, and the like which will produce favorable results under the conditions of the reaction, can also be used in practicing the invention, either alone or in admixture with soaps. The amount and kind of emulsifier used to obtain optimum results is somewhat dependent upon the relative amounts of monomeric material and aqueous phase, the reaction temperature, and the other ingredients of the polymerization mixture. Usually an amount between about 0.3 and 5 parts per 100 parts of monomeric material will be found to be sufficient.

The pH of the aqueous phase may be varied over a rather wide range without producing deleterious effects on the conversion rate or the properties of the polymer. In general the pH may be within the range of 9 to 12, with the narrower range of 9.5 to 10.5 being most generally preferred.

In preparing synthetic rubber by polymerizing conjugated dienes by the process of the invention, it is usually desirable to use a polymerization modifying agent, as is usually true in other polymerizations to produce synthetic rubber. Preferred polymerization modifiers for use in the process of the present invention are alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

The amount of hydroperoxymethane used to obtain an optimum reaction rate will depend upon the other reaction conditions, and particularly upon the type of polymerization recipe used. The amount is generally expressed in millimols per 100 parts of monomeric material, using in each instance the same units of weight throughout, i. e. when the monomeric material is measured in pounds the hydroperoxymethane is measured in millipound mols. The same is true for other ingredients of the polymerization recipe. An optimum rate of polymerization is usually obtained with the amount of hydroperoxymethane between 0.1 and 10 millimols per 100 parts by weight of monomeric material.

The monomeric material polymerized to produce polymers by the process of this invention comprises styrene, alone or together with another unsaturated organic compound which generally contains the characteristic structure $CH_2=C<$ and, in most cases has at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is styrene in an amount between 10 and 50 per cent and a polymerizable aliphatic conjugated diolefin, or a mixture of these with lesser amounts of one or more other compounds containing an active $CH_2=C<$ group which are copolymerizable therewith such as acrylic and substituted acrylic acids, esters, nitriles and amides, methyl isopropenyl ketone, vinyl chloride, and similar compounds mentioned hereinabove. In this case the products of the polymerization are high molecular weight linear copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

It is generally preferred that the emulsion be of an "oil in water" type, with the ratio of aqueous medium to monomeric material between about 0.5:1 and about 2.75:1, in parts by weight. It is frequently desirable to include water-soluble components in the aqueous phase, particularly when the polymerization temperatures are below freezing. In organic salts and alcohols can be so used. Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 50 to 200 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 per cent, or more, of the alcohol present be in the aqueous phase. A high-boiling alcohol such as glycerine is difficult to recover from the resulting serum; a low-boiling alcohol such as methanol is easily removed and frequently preferred. Other aliphatic alcohols which are higher-boiling than methanol, such as a propanol, are frequently less satisfactory. If the resulting latex tends to gel at low reaction temperatures, a larger proportion of aqueous phase should be used. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. Usually 50 to 98 per cent of the monomeric material is polymerized.

The method of this invention is applicable whenever it is desired to carry out an emulsion polymerization reaction in a redox system wherein a hydroperoxide of the type described is employed as the oxidizing component. Polymerization temperatures usually range from about −40 to about 30° C. with temperatures below about 15° C. being most generally preferred.

Advantages of this invention are illustrated by the following examples. The reactants, and their proportions, and the other specific ingredients of the recipes are presented as being typical and should not be construed to limit the invention unduly.

Example I

The following polymerization recipe was employed for effecting a series of butadiene-styrene emulsion polymerization runs:

| | Parts by weight |
|---|---|
| Butadiene | 70 |
| Styrene | 30 |
| Water, total | 192 |
| Methanol | 48 |
| Rosin soap, K salt[1] | 3.5 |
| Fatty acid soap, K salt[2] | 1.5 |
| Mercaptan blend[3] | 0.25 |
| Hydroperoxide _____(0.3 millimol) | Variable |
| Activator: | |
|    $FeSO_4.7H_2O$ _____(0.3 millimol) | 0.084 |
|    $Na_4P_2O_7.10H_2O$ ___(0.3 millimol) | 0.135 |
|    KCl | 0.25 |

[1] Dresinate 214.
[2] Potassium Office Rubber Reserve soap.
[3] A blend of tertiary $C_{12}$, $C_{14}$, and $C_{16}$ aliphatic mercaptans in a ratio of 3:1:1 parts by weight.

The activator solution was prepared by dissolving the ferrous sulfate, sodium pyrophosphate, and potassium chloride in sufficient water to make 10 volumes of solution and heating the resulting mixture to 60° C.

Seven organic hydroperoxides were used in a series of runs wherein various charging techniques were utilized. These techniques were as follows:

A. Soaps dissolved in water and methanol introduced into a vessel of large volume, without shaking; two layers formed.

B. Soaps dissolved in methanol and diluted with water.

C. Mercaptan-containing styrene layered on aqueous soap solution (in A the styrene-mercaptan mixture was introduced to form a layer between the soap solution and methanol), allowed to stand, without mixing, overnight at 0° C. and hydroperoxide then added. This procedure had, in the past, given the best results.

D. Same as C except the hydroperoxide was added to the styrene-mercaptan mixture and the layered system allowed to stand, without shaking, overnight at 0° C. This gave the best results of the new procedure.

When using procedure C, the mixture was warmed to room temperature (about 25° C.), the hydroperoxide added and then the butadiene, and the reactor pressured to 25 pounds per square inch gauge with oxygen-free nitrogen, so that a vapor space would be present in the reactor without a subatmospheric pressure. The temperature was adjusted to −10° C. and the activator solution injected. Polymerization was carried out with the temperature being held at −10° C. Procedure D is identical with C except that the hydroperoxide has already been added prior to being stored overnight.

The following data show the results obtained in procedure D (aging the hydroperoxide-mercaptan-styrene mixture) in comparison with procedure C (aging the styrene-mercaptan mixture and charging the hydroperoxide just prior to carrying out the polymerization) using both methods of preparation of the emulsifier solution. These various combinations are designated thus: A–C, A–D, B–C, and B–D.

| Hydroperoxide of | 4-Hour Conversion, percent | | | | 7-Hour Conversion, percent | | | | 24-Hour Conversion, percent | | | |
|---|---|---|---|---|---|---|---|---|---|---|---|---|
| | A–C | A–D | B–C | B–D | A–C | A–D | B–C | B–D | A–C | A–D | B–C | B–D |
| Cumene | 10 | 15 | 10 | 18 | 17 | 25 | 18 | 25 | 41 | 49 | 46 | 50 |
| Diisopropylbenzene | 17 | 24 | 20 | 28 | 27 | 36 | 30 | 39 | 63 | 74 | 70 | 77 |
| Tert-butylisopropylbenzene | 25 | 29 | 21 | 27 | 37 | 42 | 32 | 38 | 79 | 82 | 79 | 76 |
| 1,2,3,4,4a,9,10,10a, Octahydrophenanthrene | 28 | 33 | 31 | 38 | 39 | 48 | 42 | 55 | 87 | 89 | 85 | 87 |
| Triisopropylbenzene | 23 | 33 | 21 | 36 | 34 | 50 | 34 | 49 | 82 | 84 | 76 | 85 |
| Phenylcyclohexane | 14 | 39 | 32 | 37 | 24 | 57 | 44 | 50 | 79 | 79 | 79 | 85 |
| Chloro(diisopropyl)benzene | 30 | 34 | 29 | 37 | 42 | 52 | 37 | 50 | 85 | 66 | 79 | 84 |

These data show that an enhancement of polymerization rate is obtained by aging the hydroperoxide-mercaptan-styrene mixture overnight in the presence of the emulsifier solution regardless of the method of preparation and charging of the emulsifier solution.

It is felt that the results for the four and seven-hour conversions are more significant than for the 24-hour conversion, since at higher conversions the rate generally decreases, in many instances very rapidly. Also, with this active recipe, a high total conversion is usually obtained well before a total of 24 hours. It is noted that one value (66 per cent in the A–D column, 24-hour conversion, for a recipe including a hydroperoxide of chloro(diisopropyl)benzene) appears to be out of line with other data for this same recipe.

*Example II*

The following recipe was employed for carrying out two series of polymerization reactions at −10° C., using different charging procedures:

|  | Parts by weight |
|---|---|
| Butadiene | 70 |
| Styrene | 30 |
| Water | 192 |
| Methanol | 48 |
| Rosin soap, K salt[1] | 3.5 |
| Fatty acid soap, K salt[2] | 1.5 |
| Mercaptan blend[3] | 0.25 |
| Diisopropylbenzene hydroperoxide (0.33 millimol) | 0.064 |
| Activator: | |
| FeSO$_4$.7H$_2$O (0.3 millimol) | 0.084 |
| Na$_4$P$_2$O$_7$.10H$_2$O do | 0.135 |
| KCl | 0.25 |

[1] Dresinate-214.
[2] K-SF flakes.
[3] A blend of tertiary C$_{12}$, C$_{14}$, and C$_{16}$ aliphatic mercaptans in a ratio of 3:1:1 parts by weight.

The activator solution was prepared by dissolving the ferrous sulfate, sodium pyrophosphate, and potassium chloride in water and heating the resulting mixture to 60° C.

Ten polymerization runs were carried out in which a mixture of the hydroperoxide, styrene, and mercaptan was aged, together with the emulsifier, prior to charging the remaining ingredients. The aqueous emulsifier solution was first charged to the reactor, methanol was then introduced without shaking, and then the styrene containing the mercaptan and diisopropylbenzene hydroperoxide was added, so as to form an intermediate layer. The three layer system was stored, without mixing, overnight at 0° C. Butadiene was then added, the reactor pressured to 25 pounds per square inch gauge with oxygen-free nitrogen, to provide a vapor space, the temperature adjusted to −10° C., and the activator solution introduced. Polymerization was then effected in the conventional manner. In all cases the same recipe was used and the charging technique was identical. This procedure is hereinafter identified as "Procedure X."

Four polymerization runs were made, using the same recipe but a different charging technique from that described above. In these runs the aqueous emulsifier solution was added to the reactor, followed by the methanol, and then the styrene containing the mercaptan. A three layer system was formed which was allowed to stand, without mixing, overnight at 0° C. The mixture was then warmed to room temperature, about 25° C., the diisopropylbenzene hydroperoxide added and then the butadiene, and the reactor pressured to 25 pounds per square inch gauge with oxygen-free nitrogen. The temperature was adjusted to −10° C. and the activator solution injected. Polymerization was carried out in the conventional manner. This procedure is hereinafter identified as "Procedure Y."

The data herewith presented show the improved conversion rates and greater reproducibility obtained when using charging procedure X, in which the emulsifier solution, hydroperoxide, mercaptan, and styrene are aged prior to carrying out the polymerization. These results are offered in contrast to those obtained when using the charging procedure Y, in which the hydroperoxide is not aged with the styrene-mercaptan mixture.

| Procedure | Run No. | Conversion, percent | | | | Time to 60% Conversion |
|---|---|---|---|---|---|---|
| | | 2 | 4 | 7 | 24 Hours | |
| X | 1 | 11 | 22 | 43 | 77 | 15 |
| | 2 | 8 | 21 | 40 | 76 | 16 |
| | 3 | 6 | 16 | 30 | 66 | 21 |
| | 4 | 7 | 21 | 41 | 79 | 14.5 |
| | 5 | 8 | 22 | 42 | 79 | 14.5 |
| | 6 | 8 | 20 | 41 | 84 | 13.5 |
| | 7 | 8 | 21 | 41 | 82 | 14 |
| | 8 | 8 | 21 | 40 | 81 | 14 |
| | 9 | 8 | 17 | 37 | 83 | 14 |
| | 10 | 7 | 17 | 33 | 81 | 15 |
| Average | | 7.9 | 19.8 | 38.8 | 78.8 | 15.1 |
| Avg. Deviation | | ±0.7 | ±1.8 | ±3.2 | ±3.4 | ±1.3 |
| Y | 11 | 9 | 19 | 38 | 76 | 16 |
| | 12 | 2 | 10 | 23 | 71 | 18.5 |
| | 13 | 3 | 11 | 20 | 55 | 27 |
| | 14 | 6 | 17 | 33 | 78 | 16.5 |
| Average | | 5 | 14 | 29 | 70 | 19.5 |
| Avg. Deviation | | ±2.5 | ±3.8 | ±7.0 | ±7.5 | ±3.8 |

*Example III*

The recipe of Example II was used for three polymerization runs at −10° C. except that the emulsifier employed was 5.0 parts potassium tetrahydroabietate (Dresinate S-134). In the first run the emulsifier was dissolved in water, methanol added and mixed with the aqueous solution, and a styrene solution containing the mercaptan and hydroperoxide then introduced without mixing. In the second run the emulsifier was dissolved in methanol and this solution diluted with water after which the styrene mixture was introduced as before. For the third run the procedure was the same as given in Example II, to form a three layer system. In all cases the materials were aged overnight at 0° C. The following data show that the charging procedure can be varied and excellent results obtained so long as the styrene, mercaptan, and hydroperoxide are aged prior to carrying out the polymerization.

| Run No. | Conversion, percent | | |
|---|---|---|---|
| | 4.0 | 7.0 | 24.0 Hours |
| 1 | 38 | 61 | 81 |
| 2 | 42 | 66 | 79 |
| 3 | 34 | 57 | 82 |

*Example IV*

The recipe of Example II was followed for carrying out six polymerizations at −10° C. The aging step was varied in several ways. Results are shown below.

| Run | Aging Step | Conversion, percent | | | |
|---|---|---|---|---|---|
| | | 2 | 4 | 7 | 24 Hours |
| 1 | See procedure X, Example II | 8 | 17 | 37 | 83 |
| 2 | Shaken before storing at 0° C | 6 | 14 | 27 | 74 |
| 3 | Held quiet overnight at −10° C | 8 | 18 | 33 | 83 |
| 4 | Shaken before storing at −10° C | 6 | 15 | 29 | 70 |
| 5 | Styrene+ROOH+RSH, alone; 0° C | 5 | 16 | 32 | 77 |
| 6 | ROOH+RSH+CH-OH; 0° C | 1 | 8 | 18 | 58 |

These data show that best results are obtained when the mixture, which is aged, comprises a relatively dilute solution of the hydroperoxide and alkyl mercaptan in styrene. However, when such a solution is intimately admixed with an immiscible solution containing an ingredient in which the hydroperoxide or mercaptan is appreciably soluble, such as methanol or an aqueous solution of an emulsifier, the subsequent polymerization is adversely effected.

In each of the foregoing examples, the "overnight" aging was for a period of about sixteen hours.

As will be evident to those skilled in the art, various modifications of this invention can be made, or followed, in the light of the foregoing disclosure and discussion, without departing from the spirit or scope of the disclosure or from the scope of the claims.

We claim:

1. In a process for the production of synthetic rubber by the polymerization of a monomeric material comprising 90 to 65 per cent by weight of 1,3-butadiene and 10 to 35 per cent by weight of styrene while dispersed in an aqueous medium, the improvement which comprises mixing together a solution in styrene of 0.1 to 10 millimols of diisopropylbenzene hydroperoxide and 0.05 to 2 parts of an alkyl mercaptan having twelve to sixteen carbon atoms per molecule, per 100 parts by weight of total monomeric material, contacting said solution without intimate admixing with an aqueous solution of a soap, maintaining said solutions at 10 to −10° C. for a period between 1 and 20 hours, and thereafter admixing said mixture with butadiene and an iron pyrophosphate activator solution, the latter in an amount sufficient to activate a polymerization reaction and not greater than that molecularly equivalent to said hydroperoxide, and maintaining the resulting admixture at a polymerization temperature between −40 and 30° C. for a period sufficient to polymerize 50 to 98 per cent of said monomeric material.

2. In a process for the production of synthetic rubber by the polymerization of a monomeric material comprising 90 to 65 per ecnt by weight of 1,3-butadiene and 10 to 35 per cent by weight of styrene while dispersed in an aqueous medium, the improvement which comprises mixing together a solution in styrene of 0.1 to 10 millimols of a trisubstituted hydroperoxymethane containing not more than thirty carbon atoms per molecule and 0.05 to 2 parts of an alkyl mercaptan having eight to sixteen carbon atoms per molecule, per 100 parts by weight of total monomeric material, contacting said solution without intimate admixing with an aqueous solution of a soap, maintaining said solutions at 10 to −10° C. for a period between 1 and 20 hours, and thereafter admixing said mixture with butadiene and an iron pyrophosphate activator solution, the latter in an amount sufficient to activate a polymerization reaction and not greater than that molecularly equivalent to said hydroperoxide, and maintaining the resulting admixture at a polymerization temperature between −40 and 30° C. for a period sufficient to polymerize 50 to 98 per cent of said monomeric material.

3. The process of claim 2 in which said hydroperoxymethane is a product of the oxidation of triisopropylbenzene.

4. The process of claim 2 in which said hydroperoxymethane is a product of the oxidation of tertiarybutyl(isopropyl)benzene.

5. A process for the polymerization of a monomeric material comprising styrene while dispersed in an aqueous medium, which comprises dissolving in liquid styrene 0.1 to 10 millimols of diisopropylbenzene hydroperoxide and 0.05 to 2 parts of an alkyl mercaptan having eight to sixteen carbon atoms per molecule, per 100 parts by weight of total monomeric material, maintaining said solution at 30 to −20° C. for a period of at least one hour, admixing the resulting solution with an aqueous medium containing an emulsifying agent and with an iron pyrophosphate activator solution in an amount sufficient to activate a polymerization reaction and not greater than that molecularly equivalent to said hydroperoxide, at a polymerization temperature between −40 and 30° C., and recovering a resulting polymeric material so produced.

6. In a process for the polymerization of an organic monomeric material comprising styrene while dispersed in an aqueous medium, the improvement which comprises dissolving together in a homogeneous solution in styrene a trisubstituted hydroperoxymethane containing not more than thirty carbon atoms per molecule and an alkyl mercaptan containing from eight to sixteen carbon atoms per molecule, said solution containing said constituents in relative amounts of 0.1 to 10 millimols of hydroperoxymethane and 0.05 to 2 parts by weight of mercaptan, maintaining said solution for a period of at least one hour at 30 to −20° C., and admixing the resulting solution with an aqueous medium containing an emulsifying agent and with such a monomeric material, in an amount such that there is the aforesaid amounts of hydroperoxymethane and mercaptan per 100 parts by weight of said monomeric material, and with an iron pyrophosphate activator solution in an amount not greater than that molecularly equivalent to said hydroperoxymethane.

7. The process of claim 6 in which said monomeric material comprises a major amount of 1,3-butadiene and a minor amount of styrene, and said hydroperoxymethane-mercaptan solution is a solution comprising styrene.

8. The process of claim 7 in which said hydroperoxymethane is a product of the oxidation of diisopropylbenzene.

9. The process of claim 6 in which said monomeric material comprises a major amount of 1,3-butadiene and a minor amount of styrene, said hydroxybenzene-mercaptan solution is a solution in styrene of said mercaptan and a hydroperoxymethane which is a product of the oxidation of triisopropylbenzene.

10. The process of claim 6 in which said monomeric material comprises a major amount of 1,3-butadiene and a minor amount of styrene, said hydroxybenzene-mercaptan solution is a solution in styrene of said mercaptan and a hydroperoxymethane which is a product of the oxidation of tertiarybutyl(isopropyl)benzene.

11. The process of claim 6 in which said hydroperoxymethane is a product of the oxidation of phenylcyclohexane.

12. The process of claim 6 in which said hydroperoxymethane is a product of the oxidation of chloro(diisopropyl)benzene.

CHARLES F. FRYLING.
ARCHIE E. FOLLETT.

REFERENCES CITED

The following references are of record in the file of this patent:

UNITED STATES PATENTS

| Number | Name | Date |
|---|---|---|
| 2,471,938 | Crouch et al. | May 31, 1949 |
| 2,496,864 | Fiedler et al. | Feb. 7, 1950 |

OTHER REFERENCES

Shearon, Jr. et al., Ind. and Eng. Chem., May 1948, pp. 769 to 777